(12) United States Patent
Horiuchi et al.

(10) Patent No.: US 7,281,851 B2
(45) Date of Patent: Oct. 16, 2007

(54) SPINDLE DEVICE UTILIZING EXTERNALLY PRESSURIZED GAS BEARING ASSEMBLY

(75) Inventors: Teruyoshi Horiuchi, Iwata (JP); Junichi Hirata, Iwata (JP)

(73) Assignee: NTN Corporation, Osaka (JP)

( * ) Notice: Subject to any disclaimer, the term of this patent is extended or adjusted under 35 U.S.C. 154(b) by 479 days.

(21) Appl. No.: 10/951,615

(22) Filed: Sep. 29, 2004

(65) Prior Publication Data

US 2005/0069233 A1 Mar. 31, 2005

(30) Foreign Application Priority Data

Sep. 30, 2003 (JP) ............................. 2003-339338

(51) Int. Cl.
*F16C 32/06* (2006.01)
(52) U.S. Cl. ..................................... 384/100
(58) Field of Classification Search ................ 384/100, 384/448
See application file for complete search history.

(56) References Cited

U.S. PATENT DOCUMENTS 4,326,128 A * 4/1982 Klein .................... 250/231.14
5,235,591 A * 8/1993 Nakamura et al. ............ 369/199
2002/0122608 A1 * 9/2002 Fujikawa et al. ........... 384/100

OTHER PUBLICATIONS

Fujikawa Yoshio et al., Patent Abstracts of Japan, "Spindle Device With Encoder", Publication No. 10-239102 and Publication Date: Sep. 11, 1998.

* cited by examiner

*Primary Examiner*—Thomas R. Hannon

(57) ABSTRACT

There is provided a spindle device utilizing an externally pressurized gas bearing assembly, in which the center of a pulse disc of a rotary encoder can be adjusted to minimize an unbalance of the weight of the pulse disc and such unbalance can be adjusted easily to minimize fluctuation of the pulse disc during rotation and to achieve a highly precise detection of the rotational position consistent with the resolution of the rotary encoder. The spindle device includes an externally pressurized gas bearing assembly (3) for rotatably supporting a shaft (1), a motor (10) for driving the shaft (1), and a rotary encoder (19) for detecting a rotational position. A pulse disc (16) of the rotary encoder (19) is fixed on a mounting surface (S), arranged in the vicinity of one end of the shaft (1) and lying perpendicular to a central axis of the shaft (1), by a fastening member (17) such as a bolt removably inserted through a fastening member inserting portion (7) provided in the pulse disc (16). The mounting surface (S) is an end face of a mounting base (12) fixed to that end of the shaft (1). This mounting base (12) is fixed to the shaft (1) by means of a plurality of radially extending set screws (13).

5 Claims, 4 Drawing Sheets

SPINDLE DEVICE UTILIZING EXTERNALLY PRESSURIZED GAS BEARING ASSEMBLY

BACKGROUND OF THE INVENTION

1. Field of the Invention

The present invention relates to a spindle device utilizing an externally pressurized gas bearing assembly, which device is provided with a rotary encoder used in precision machines and precision inspection equipments.

2. Description of the Prior Art

A spindle device utilizing an externally pressurized gas bearing assembly is well known, in which a rotary encoder is mounted on a shaft, such as disclosed in the Japanese Laid-open Patent Publication No. 10-239102. The spindle device utilizing the externally pressurized gas bearing assembly such as disclosed in the previously mentioned patent publication makes use of, separate from the shaft, a disc mounting member, on which a pulse disc forming a component part of the rotary encoder is mounted and which is secured to an end face of the shaft by means of bolts so that the geometric center of the plaid pattern on the pulse disc may be aligned with the axis of the shaft during rotation of the latter.

The spindle device utilizing the externally pressurized gas bearing assembly is largely used in the field of manufacture and inspection of magnetic discs and optical discs. As is well recognized by those skilled in the art, in order to increase the recording density of those discs, it is necessary to record data signals in high density, hence, to increase the positioning precision of a magnetic head. For this reason, it often occurs that the high resolution rotary encoder is fitted to the spindle device utilizing the externally pressurized gas bearing assembly, so that the rotational position of the shaft can be precisely detected to correct the position of the magnetic head and the timing at which data are recorded and/or read.

For the high resolution rotary encoder, a reflection type optical rotary encoder may be utilized, in which a laser beam is used as a detecting light.

Since the high resolution rotary encoder provides a substantial number of output pulses per rotation, the frequency of the output pulses may be too high to be used as a feedback signal for controlling the rotation of a motor and, therefore, the conventional motor drive circuit is incapable of accommodating it.

In view of the foregoing, it is contemplated to build both of the high resolution rotary encoder for providing a correction signal and the conventional rotary encoder for providing the feedback signal in the spindle device utilizing the externally pressurized gas bearing assembly.

However, this contemplated construction requires the two rotary encoders to be fitted to one end of the shaft of the spindle device of the specified type and, therefore, they protrude a substantial distance axially outwardly from a bearing portion for that end of the shaft, where the rotary encoders are mounted, and the runout precision tends to be degraded when unbalance occurs as a result of mounting of the pulse disc of the rotary encoder.

While the center of the disc mounting member is not generally aligned with the geometric center of the plaid pattern of the pulse disc, alignment of the geometric center of the plaid pattern of the pulse disc with the axis of rotation of the shaft results in misalignment between the center of the disc mounting member and the axis of rotation of the shaft, eventually resulting in the unbalance which leads to an increased fluctuation of the shaft during rotation. Also, where in the reflection type optical rotary encoder, a sheet-like scale is bonded to a metallic disc to form the pulse disc, the pulse disc has a substantial mass as compared with that made of a plate glass and, therefore, if the center of gravity of the pulse disc does not align with the center of the plaid pattern of the scale, even the slightest misalignment tends to result in a considerable unbalance.

In the event that the pulse disc tilts as a result of a machining error, rotation of the shaft leads to change of the distance between a detecting head and the pulse disc, constituting a cause of the detection error.

Because of those reasons, the position of the detecting head requires a precise adjustment relative to the pulse disc. If dismantling is carried out once the detecting head has been adjusted, re-adjustment of the position of the detecting head is required, resulting in increase of work steps. Also, where a laser beam is used as a detecting means, an error tends to occur in the output under the influence of irregular flow of air resulting from rotation of the pulse disc.

SUMMARY OF THE INVENTION

Accordingly, the present invention has for its object to provide a spindle device utilizing an externally pressurized gas bearing assembly, in which the position of the center of a pulse disc of a rotary encoder can be adjusted to minimize the unbalance of the weight of the pulse disc and such unbalance can easily be adjusted to minimize fluctuation of the pulse disc during rotation and in which where a high resolution rotary encoder is employed, the rotational position can be detected with a high precision consistent with such high resolution.

Another object of the present invention is to enable the tilt of the pulse disc to be adjusted.

A further object of the present invention is to minimize the influence brought about by the irregular flow of air resulting from rotation of the pulse disc, where a laser beam is employed as a detecting means.

A still further object of the present invention is to eliminate the need to adjust the position of a detecting head during dismantling or re-assemblage once the position of the detecting head has been adjusted.

The spindle device utilizing an externally pressurized gas bearing assembly according to the present invention includes externally pressurized gas bearings for rotatably supporting a shaft of the spindle device, a motor for driving the shaft, and a rotary encoder for detecting a rotational position of the shaft and is characterized in that a pulse disc of the rotary encoder is fixed on a mounting surface, arranged in the vicinity of one end of the shaft and lying perpendicular to a central axis of the shaft, by means of a fastening member removably inserted through a fastening member inserting portion provided in the pulse disc.

According to this construction, since the structure is employed in which the pulse disc is fixed to the mounting surface of the shaft by means of the removable fastening member inserted in the fastening member inserting portion in the pulse disc, adjustment of the center position of the pulse disc is possible in a quantity corresponding to the play of the fastening member within the fastening member inserting portion. Accordingly, the center of a plaid pattern on the pulse disc can be aligned with the axis of the shaft. Also, since it is only the pulse disc which moves as a result of the position adjustment, as compared with the structure in which the pulse disc moves together with the disc mounting member such as disclosed in the previously discussed patent publication, the unbalance brought about by the position adjustment of the pulse disc is minimal. For this reason, fluctuation of the pulse disc during the rotation thereof can be minimized and, where a high resolution rotary encoder is employed, it is possible to achieve a highly precise detection of the rotational position.

In the present invention, the mounting surface on which the pulse disc is fixed may be an end face of a mounting base fixed to that end of the shaft and this mounting base may be fixed to the shaft by means of a plurality of radially extending set screws.

Where the mounting base is fixed to the shaft by the plural radially extending set screws, the tilt of the pulse disc can be adjusted. Accordingly, change in distance between the pulse disc and a detecting portion of the rotary encoder can be minimized with the output of the rotary encoder consequently stabilized.

In the present invention, screw holes for respective balance correcting members may be provided on an end face or an outer peripheral surface of an outer peripheral portion of the mounting base, or on an end face or an outer peripheral surface of an outer peripheral portion of the pulse disc, while being spaced an equal distance from each other along the circumference of the mounting base or the pulse disc.

The circumferential equal disposition of the screw holes makes it possible to insert the balance correcting members freely into the screw holes and an unbalance in weight in the circumferential direction can easily be resolved, allowing the runout precision to be further increased.

In any one of the constructions of the spindle device utilizing the externally pressurized gas bearing assembly of the present invention, a cover may be provided for covering the pulse disc, and the detecting head of the rotary encoder may be fixed to an outside of the cover. A window may be provided in the cover for passage of a detection light emitted from the detecting head and may be closed by a transparent plate.

Where a laser beam is employed as a detecting means, if the window in the cover is not closed, an irregular flow of air occurs during rotation of the pulse disc, adversely affecting the detecting precision. However, if the window is closed by the transparent plate as described above, the irregular flow of air during rotation of the pulse disc and its influence on the detecting precision can be reduced.

In any one of the constructions of the spindle device utilizing the externally pressurized gas bearing assembly of the present invention, a positioning bush having an eccentric bolt hole may be held in contact with a predetermined position of the detecting head forming a part of the rotary encoder, and fixed to a detecting head fixing base in a fashion with the positioning bush held in contact with the detecting head by means of a fixing bolt extending through the eccentric hole.

Where the positioning bush having the eccentric bolt hole is employed as described above, provided that once the adjustment of the position of the detecting head of the rotary encoder has been carried out, by urging the detecting head against the positioning bush during re-assemblage after the dismantling while the rotational angle of the positioning bush is maintained, the position of the detecting head before the dismantling can be reproduced and, therefore, no re-adjustment is required.

In any one of the constructions of the spindle device utilizing the externally pressurized gas bearing assembly of the present invention, a second rotary encoder may be employed, which has resolution lower than that of the above described rotary encoder.

Since the high resolution rotary encoder provides a large number of output pulses per rotation, the use of the output pulses as a feedback signal for the control of the rotation would result in the feedback signal of a considerably high frequency and, therefore, the conventional motor control circuit cannot handle such feedback signal. However, the use of the second rotary encoder of a low resolution is effective to allow the use of the conventional general motor control circuit. Because of this, while the first rotary encoder has a resolution required for the external outputting, the control can be performed easily.

DETAILED DESCRIPTION OF THE EMBODIMENTS

Figure 1:
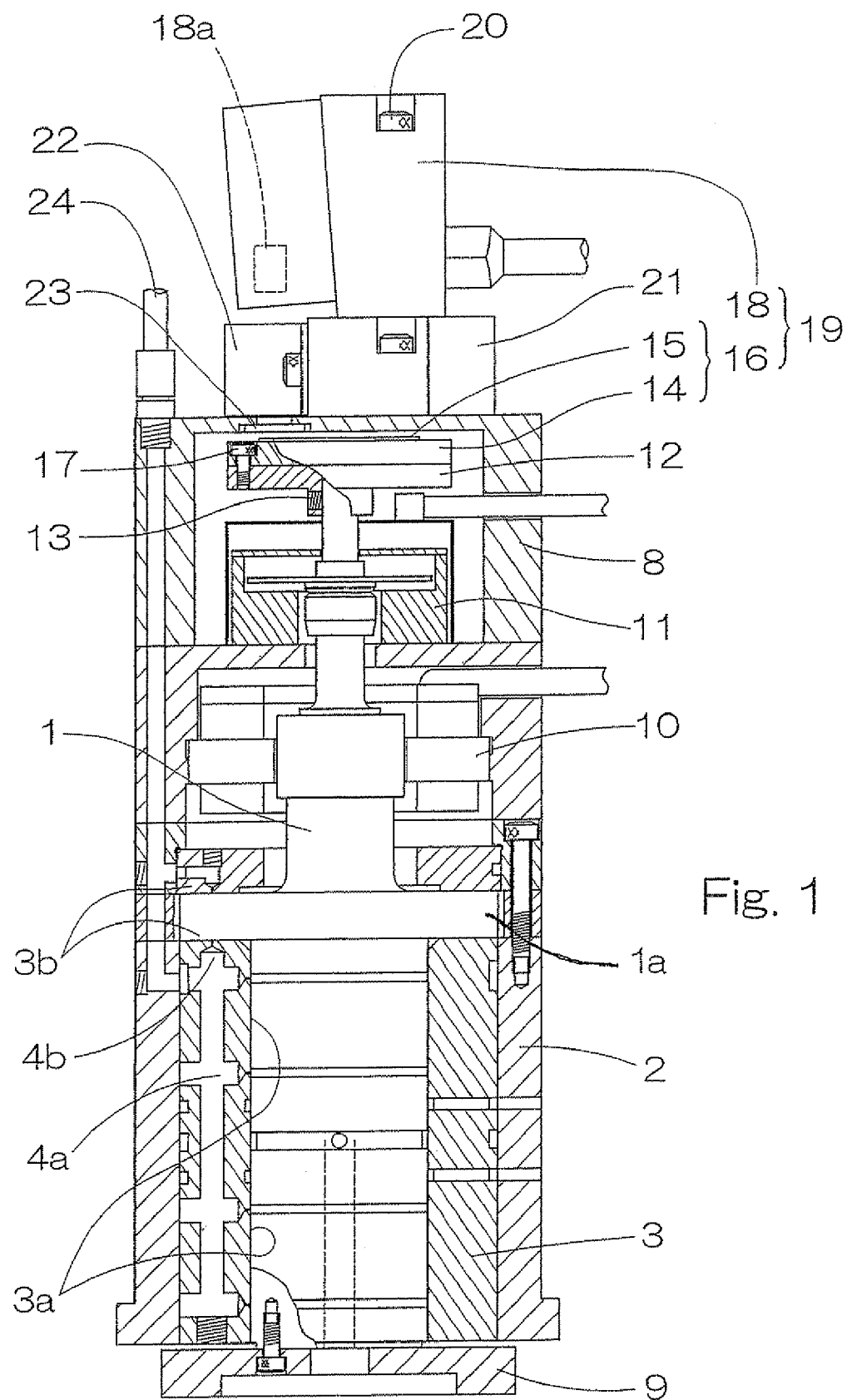
FIG. 1 is a longitudinal sectional view of a spindle device utilizing an externally pressurized gas bearing assembly according to a preferred embodiment of the present invention.

A first preferred embodiment of the present invention will now be described with reference to FIGS. 1 to 3. FIG. 1 illustrates a longitudinal sectional view of a spindle device utilizing an externally pressurized gas bearing assembly according to this embodiment. It is to be noted that the spindle device utilizing the externally pressurized gas bearing assembly may be used in practice in a fashion inverted upside down relative to the position shown therein. A shaft 1 of the spindle device is supported in a non-contact fashion within a housing 2 by an externally pressurized gas bearing assembly 3. The externally pressurized gas bearing assembly 3 includes externally pressurized gas journal bearings 3a and externally pressurized gas thrust bearings 3b. The externally pressurized gas journal bearings 3a and the externally pressurized gas thrust bearings 3b cooperate to support the shaft 1 in a non-contact fashion by jetting a compressed gas from nozzles 4a and 4b into respective radial and axial bearing gaps defined between the externally pressurized gas bearing assembly 3 and the shaft 1. The shaft 1 has a flange 1a and the externally pressurized gas thrust bearings 3b operate to jet a compressed gas into bearing gaps on respective opposite surfaces of the flange 1a. The nozzles 4a and 4b are fluid-connected with a source of supply of the compressed gas (not shown) through a gas supply passage 24.

One end of the shaft 1 is provided with a turntable 9 on which a work (not shown) such as a magnetic disc is fixed by a mounting means (not shown) such as a vacuum chuck. This shaft 1 is driven highly precisely by a built-in motor 10 within the housing 2. The other end of the shaft 1 is provided with a first rotary encoder 19 for external outputting and a second rotary encoder 11 for control, both of which output a signal indicative of the rotational position.

Since an output from the external outputting encoder 19 is used for correction of an error in rotational position, the encoder 19 is preferred to have as high a resolution as possible. However, if the resolution of the rotary encoder is increased, the number of pulses outputted per rotation increases, accompanied by increase of the frequency of the output signal. Where the frequency of the output signal from the rotary encoder appropriate to the resolution required for external outputting exceeds the uppermost limit of the frequency of a feedback signal capable of being handled by a control circuit for a motor, such motor cannot be controlled with the output from such rotary encoder. However, as is the case with the illustrated embodiment, the use of the control rotary encoder 11 for outputting the feedback signal for controlling the motor and the external outputting rotary encoder 19, both mounted on the shaft 1, is effective to simultaneously secure a signal of the frequency appropriate to the feedback signal for the control and a signal of a high resolution required for the external outputting.

Figure 2:
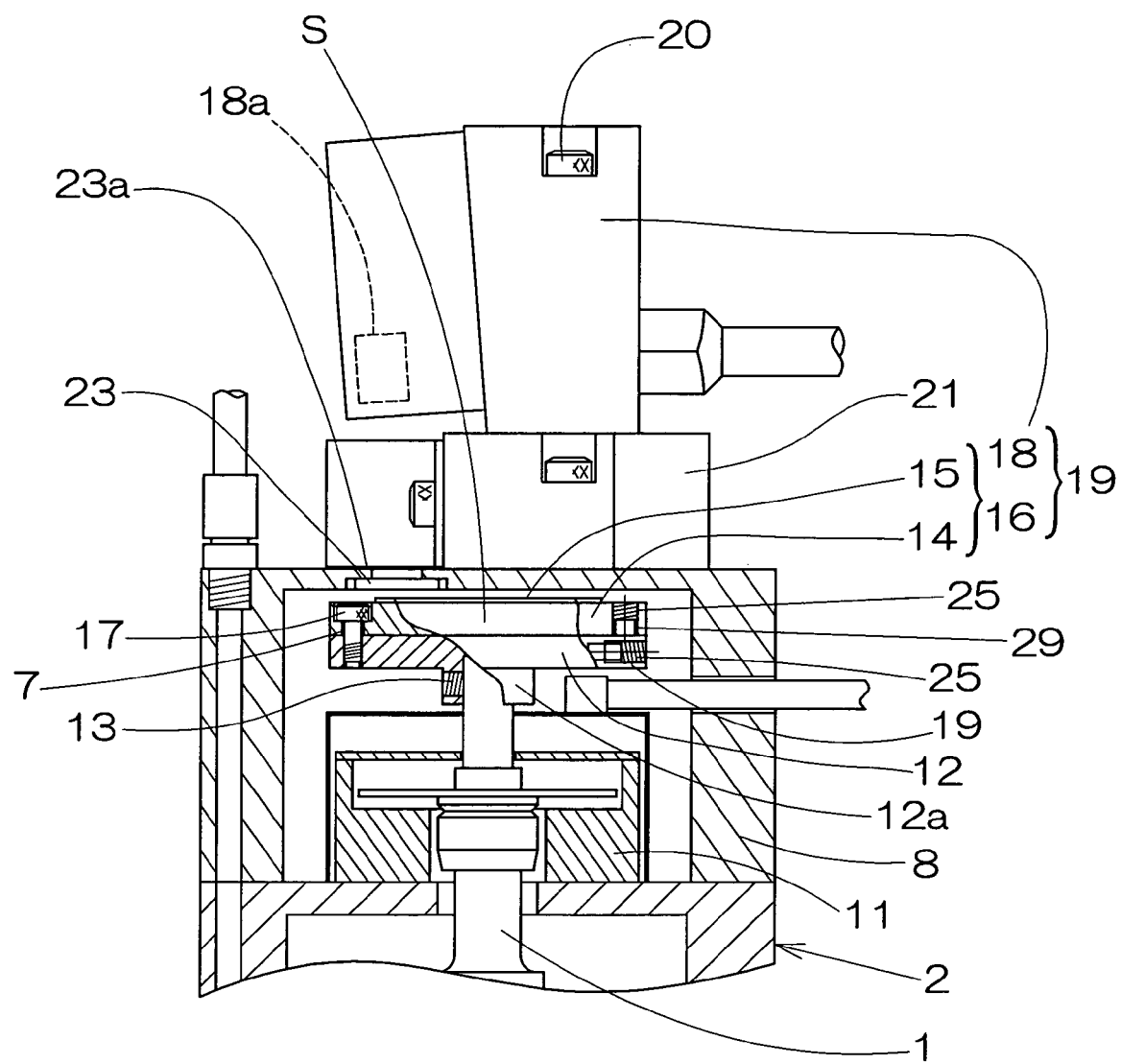
FIG. 2 is a fragmentary longitudinal sectional view of the spindle device utilizing the externally pressurized gas bearing assembly, showing a rotary encoder employed therein on an enlarged scale.

FIG. 2 illustrates an enlarged view of a site where the rotary encoders 11 and 19 are arranged. A pulse disc 16 of the external outputting rotary encoder 19 includes a scale support plate 14 to which a sheet-like scale 15 is applied. The rotational position of the shaft 1 can be detected by emitting a laser beam from a detecting portion 18a of a detecting head 18 and then detecting a plaid pattern in reference to light reflected from the scale 15 by the detecting portion 18a.

The pulse disc 16 is removably fitted by means of fastening members 17 to a mounting surface S made up of an end face of a mounting base 12 fitted to one end of the shaft 1 by means of set screws 13. The mounting surface S is a plane perpendicular to the central axis of the shaft 1. The fastening members 17 are inserted into respective fastening member inserting portions 7 each in the form of a hole or groove formed in the pulse disc 16 and extending completely across the thickness of the pulse disc 16. The fastening members 17 are employed in the form of bolts in the illustrated embodiment. This specific mounting structure allows the pulse disc 16 to be moved relative to the mounting base 12, hence, the shaft 1 a distance corresponding to the play of the fastening members 17 within the fastening member inserting portions 7. By this relative movement, the center of the plaid pattern of the pulse disc 16 can be aligned with the axis of rotation of the shaft 1.

An end face of an outer peripheral portion of the scale support plate 14 is provided with a plurality of screw holes 29 arranged on a circumference of the plate 14. When the center of the plaid pattern of the pulse disc 16 is aligned with the axis of rotation of the shaft 1, the center of gravity of the pulse disc 16 generally does not align with the axis of rotation of the shaft 1 and an unbalance therefore occurs. In such case, when a balance correcting member 25 such as a set screw of a suitable weight is fitted into each of the screw holes 29, the unbalance can easily be corrected. At the time the correction of the unbalance has completed, the balance correcting members 25 are preferably fixed in position by a bonding agent. The screw holes 29 for receiving the balance correcting members 25 may be provided in the end face of the outer peripheral portion of the scale support plate 14 or an outer peripheral surface of the scale support plate 14.

Also, the screw holes 29 for receiving the balance correcting members 25 may be provided in an end face of an outer peripheral portion of the mounting base 12. Although in FIG. 2, the screw holes 29 have been shown and described as provided in the end face of the scale support plate 14 and the outer peripheral surface of the mounting base 12 for the sake of explanation, the screw holes 29 may be provided in one of the mounting base 12 and the scale support plate 14.

Figure 5:
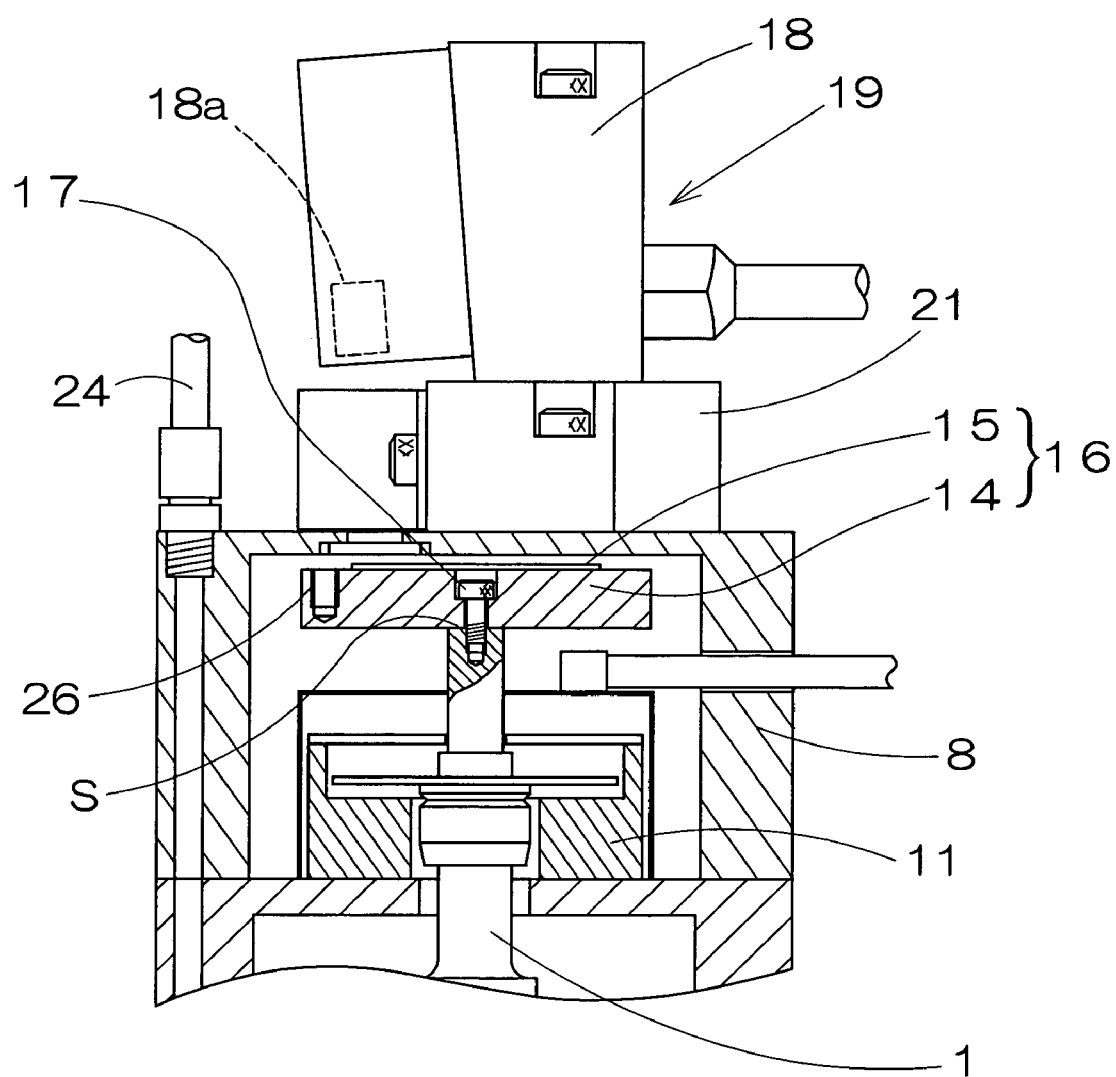
FIG. 5 is a fragmentary longitudinal sectional view of a spindle device utilizing an externally pressurized gas bearing assembly according to another preferred embodiment of the present invention, showing a rotary encoder employed in the spindle device.

The mounting base 12 may not be necessarily employed, but the use of the mounting base 12 is advantageous in that the above described centering structure can be obtained even where a bolt hole cannot be provided in a center portion of the pulse disc 16. As shown in FIG. 5, where the bolt hole is provided in the center portion of the pulse disc 16, the pulse disc 16 may be fitted directly to an end face of the shaft 1 by means of a fastening member 17 such as a bolt without the mounting base 12 employed. In such case, the end face of the shaft 1 serves as the above described mounting surface S. Elimination of the use of the mounting base 12 is effective to reduce the mass added to the end of the shaft 1 and, hence, to relieve lowering of the natural frequency of the shaft 1 system.

In the embodiment shown in FIGS. 1 and 2, a cylindrical boss 12a engageable on an outer periphery at one end of the shaft 1 is provided in the mounting base 12, a plurality of set screws 13 are arranged on the circumference of the boss 12a and the mounting base 12 is fixed on the shaft 1 by those set screws 13. The set screws 13 are engaged in respective screw holes that extend completely across the thickness of a peripheral wall of the boss 12a. Where the single set screw 13 is employed to fix the mounting base 12 on the shaft 1, an inner peripheral surface of the boss 12a will be urged against the shaft 1 by the action of the set screw 13, but if the structure is employed in which the plural set screws 13 are employed as described above, the inner peripheral surface of the boss 12a can be fixed relative to the outer periphery of the shaft 1 through a gap. For this reason, within the limit of the gap of the boss 12a, any tilt of the mounting base 12 can be adjusted. In this way, even when a machining error occurs in various component parts, change in distance between the scale 15 and the detecting head 18 during rotation can advantageously be minimized.

The pulse disc 16 is covered by an encoder cover 8 fitted to the housing 2. A laser beam emitted from the detecting portion 18a of the detecting head 18 passes through a window 23a, provided in the encoder cover 8, and is subsequently reflected by the scale 15 and the reflected laser beam eventually impinges on the detecting portion 18a of the detecting head 18, with the plaid pattern of the scale 15 consequently detected thereby. As the pulse disc 16 rotates together with rotation of the shaft 1, an irregular flow of air occurs around the pulse disc 16. This irregular air flow reduces the detecting accuracy of the plaid pattern with the laser beam, resulting in increase of an error in detecting the rotational position of the shaft 1. By positioning the pulse disc 16 within a narrow closed space within the encoder cover 8, the irregular air flow occurring during rotation can be suppressed, but the presence of a hole leading to the atmosphere permits an air to pass through such hole, constituting a cause of change in air flow. For this reason, the window 23a through which the laser beam passes is provided with a transparent plate 23, made of a transparent material such as glass, to thereby avoid passage of an external air. In this way, the change in air flow during the rotation can be suppressed and the accuracy of detection of the rotational position can be increased. The transparent plate 23 may be a member separate from the encoder cover 8, but fitted to the encoder cover 8, or formed integrally with the encoder cover 8, where the encoder cover 8 is made of a synthetic resin, by means of a two-color molding technique.

Figure 3:
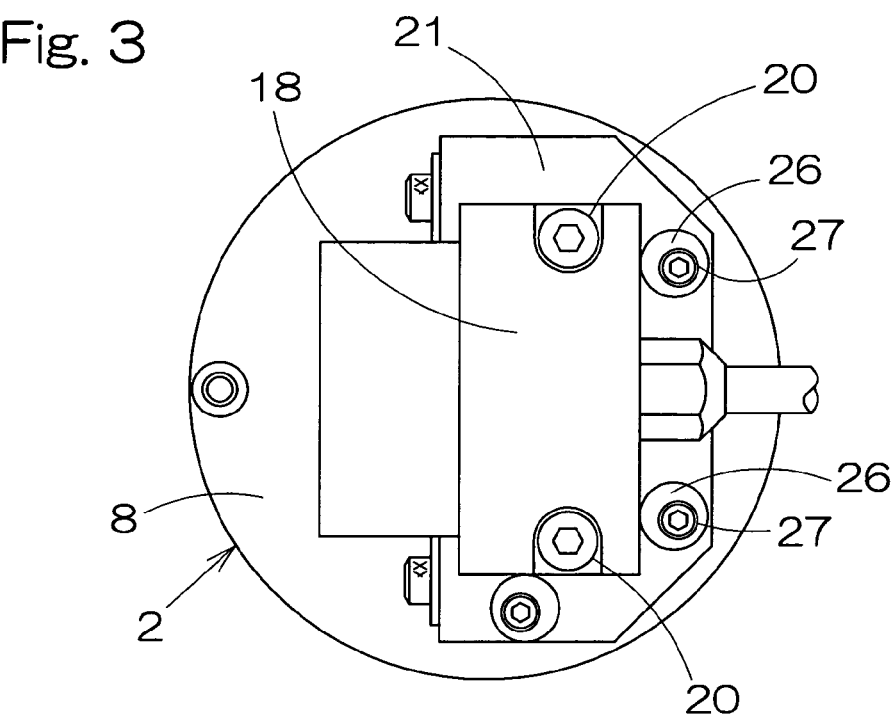
FIG. 3 is a plan view, on an enlarged scale, showing a detecting head of the rotary encoder.
Figure 4:
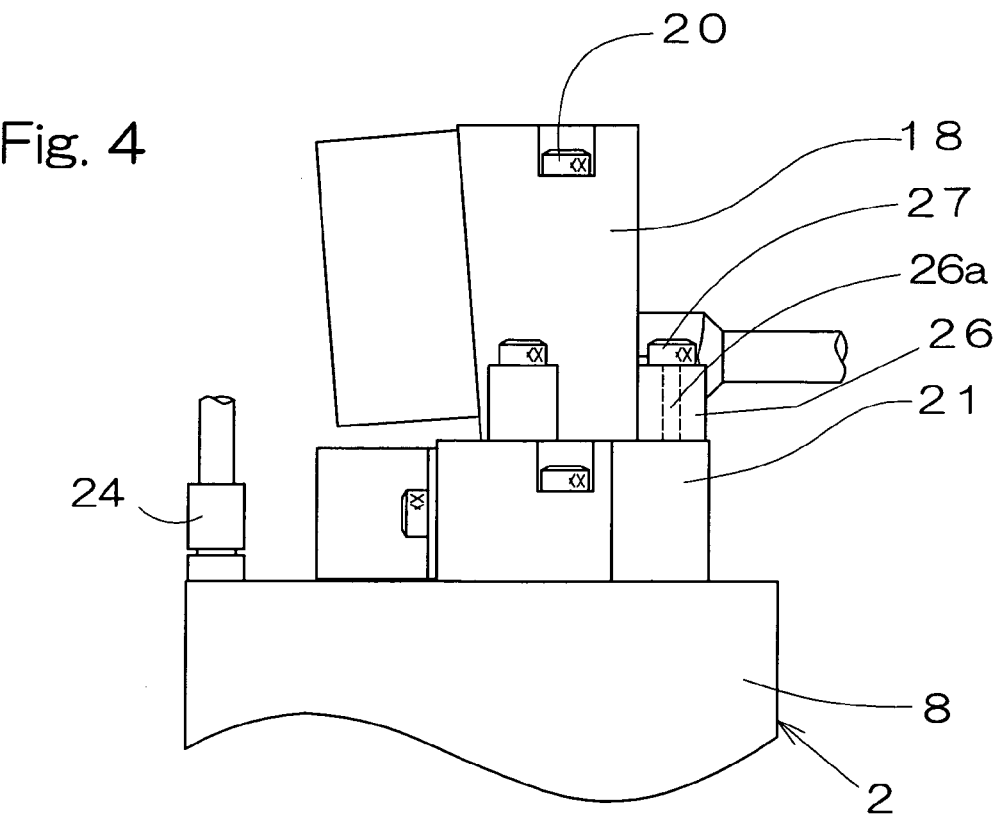
FIG. 4 is a front elevational view, on an enlarged scale, showing the detecting head of the rotary encoder.

FIG. 3 illustrates a fixing portion for the detecting head 18. The detecting head 18 is fixed to a detecting head fixing base 21, which is a fixing portion for the detecting portion, by means of head fixing bolts 20. The detecting head fixing base 21 is fixed to the encoder cover 8 and is therefore fixed to the housing 2. As a means for accurately positioning the detecting head 18 fixed by the above described head fixing bolt 20, positioning bushes 26 are provided. This positioning bush 26 is a member having a cylindrical outer peripheral surface and is provided with an eccentric hole 26a (FIG. 4) therein relative to the center thereof. A bush fixing bolt 27 is passed through this eccentric hole 26a to thereby fix the positioning bush 26 to the head fixing base 21.

In such case, after the detecting head 18 is positioned relative to the scale 15 in a manner with the bush fixing bolts 27 and the head fixing bolts 20 loosened, the head fixing bolts 20 are firmly fastened to fix the detecting head 18. Subsequently, the positioning bushes 26 are turned until they contact the detecting head 18 and the bush fixing bolts 27 are then firmly fastened to fix the positioning bush 26. When dismantling, undoing the head fixing bolts 20 enables the detecting head 18 to be removed. When re-assembling, by urging the detecting head 18 against the positioning bushes 26, the positional relation between the detecting head 18 and the scale 15 can be reproduced and, therefore, no re-adjustment is required.

It is to be noted that in any one of the foregoing embodiments, reference has been made to the spindle device utilizing the externally pressurized gas bearing assembly in which two rotary encoders 11 and 19 are incorporated, but the present invention can be equally applied even where only one high resolution rotary encoder 19 is employed. In such case, since an output from the high resolution rotary encoder 19 is required to be used concurrently as a feedback signal for the motor control circuit and, therefore, the use has to be made of a motor control circuit capable of handling the feedback signal of a high frequency or a frequency dividing circuit for dividing the frequency of the output pulse from the high resolution rotary encoder 19, so that the frequency can be reduced down to a value capable of being handled by the motor control circuit.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A spindle device utilizing an externally pressurized gas bearing assembly, comprising:
    externally pressurized gas bearings to rotatably support a shaft of the spindle device;
    a motor to drive the shaft; and
    a rotary encoder to detect a rotational position of the shaft,
    wherein a pulse disc of the rotary encoder is fixed on a mounting surface, arranged in the vicinity of one end of the shaft and lying perpendicular to a central axis of the shaft, by a fastening member removably inserted through a fastening member inserting portion provided in the pulse disc,
    the mounting surface on which the pulse disc is fixed is an end face of a mounting base fixed to that end of the shaft and said mounting base is fixed to the shaft by a plurality of radially extending set screws, and
    screw holes for respective balance correcting members are provided on an end face or an outer peripheral surface of an outer peripheral portion of the mounting base and spaced an equal distance from each other along the circumference of the mounting base.

2. The spindle device utilizing the externally pressurized gas bearing assembly as claimed in claim 1, wherein a cover is provided for covering the pulse disc and a detecting head of the rotary encoder is fixed to an outside of the cover and wherein a window is provided in the cover for passage of a detection light emitted from the detecting head and is closed by a transparent plate.

3. A spindle device utilizing an externally pressurized gas bearing assembly, comprising:
    externally pressurized gas bearings to rotatably support a shaft of the spindle device;
    a motor to drive the shaft; and
    a rotary encoder to detect a rotational position of the shaft,
    wherein a pulse disc of the rotary encoder is fixed on a mounting surface, arranged in the vicinity of one end of the shaft and lying perpendicular to a central axis of the shaft, by a fastening member removably inserted through a fastening member inserting portion provided in the pulse disc, and
    screw holes for respective balance correcting members are provided on an end face or an outer peripheral surface of an outer peripheral portion of the pulse disc and spaced an equal distance from each other along the circumference of the pulse disc.

4. A spindle device utilizing an externally pressurized gas bearing assembly, comprising:
    externally pressurized gas bearings to rotatably support a shaft of the spindle device;
    a motor to drive the shaft; and
    a rotary encoder to detect a rotational position of the shaft,
    wherein a pulse disc of the rotary encoder is fixed on a mounting surface, arranged in the vicinity of one end of the shaft and lying perpendicular to a central axis of the shaft, by a fastening member removably inserted through a fastening member inserting portion provided in the pulse disc,
    a positioning bush having an eccentric bolt hole is held in contact with a predetermined position of a detecting head forming a part of the rotary encoder, and is fixed to a detecting head fixing base in a fashion with the positioning bush held in contact with the detecting head by a fixing bolt extending through the eccentric hole.

5. A spindle device utilizing an externally pressurized gas bearing assembly, comprising:
    externally pressurized gas bearings to rotatably support a shaft of the spindle device;
    a motor to drive the shaft; and
    a rotary encoder to detect a rotational position of the shaft,
    wherein a pulse disc of the rotary encoder is fixed on a mounting surface, arranged in the vicinity of one end of the shaft and lying perpendicular to a central axis of the shaft, by a fastening member removably inserted through a fastening member inserting portion provided in the pulse disc, and
    a second rotary encoder is employed, which has a resolution lower than that of the first rotary encoder.

* * * * *